(12) United States Patent
Red et al.

(10) Patent No.: US 7,496,420 B2
(45) Date of Patent: Feb. 24, 2009

(54) SYSTEMS AND METHODS FOR EFFICIENTLY IMPLEMENTING AN N-STEP MANUFACTURING PROCESS FOR PRODUCING A MECHANICAL PART

(75) Inventors: W. Edward Red, Provo, UT (US); C. Gregory Jensen, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 11/739,007

(22) Filed: Apr. 23, 2007

(65) Prior Publication Data

US 2007/0250198 A1 Oct. 25, 2007

Related U.S. Application Data

(60) Provisional application No. 60/795,239, filed on Apr. 24, 2006.

(51) Int. Cl.
*G06F 19/00* (2006.01)
(52) U.S. Cl. .............. 700/98; 700/182; 703/1
(58) Field of Classification Search .......... 700/97, 700/98, 105, 182; 703/1
See application file for complete search history.

(56) References Cited

U.S. PATENT DOCUMENTS 5,586,039 A * 12/1996 Hirsch et al. .......... 700/95
6,909,933 B2 6/2005 Maeritz
6,940,037 B1 * 9/2005 Kovacevic et al. ..... 219/121.64
7,027,943 B2 4/2006 Steinkirchner et al.
2003/0114945 A1 * 6/2003 Hirano et al. ............... 700/97
2005/0113951 A1 5/2005 Akiyama et al.

OTHER PUBLICATIONS

Jeffery Campbell, Jordan Cox, Richard Helps, Greg Jensen, Edward Red, Utah Center of Excellence For Direct Machining And Control (DMAC), Mar. 14, 2006.
"The Written Opinion of the International Searching Authority that was received in connection with the corresponding PCT application."
"The International Search Report that was received in connection with the corresponding PCT application."

* cited by examiner

Primary Examiner—Albert DaCady
Assistant Examiner—Douglas S Lee
(74) Attorney, Agent, or Firm—Austin Rapp & Hardman

(57) ABSTRACT

A method for efficiently implementing an N-step manufacturing process for producing a mechanical part may include creating a parametric master model that represents a part to be produced in an N-step manufacturing process. The method may also include using the parametric master model to create process plans for the N-step manufacturing process. After manufacturing step i of the N-step manufacturing process, the method may include receiving information concerning values of parameters in the parametric master model as they exist after manufacturing step i of the N-step manufacturing process. Updates to the parametric master model may be made based on the information that was received. The process plans corresponding to manufacturing step i+1 of the N-step manufacturing process may be updated based on the updated parametric master model.

20 Claims, 9 Drawing Sheets

Download:

Shaft.CATPart

Shaft.CATProcess

Shaft.CATDrawing

CNC code

Enter the new measured values.

Diameter 1: ☐

Diameter 2: ☐

Diameter 3: ☐

Length 1: ☐

Length 2: ☐

Length 3: ☐

Select the process just completed.

Lathe: ☐   Heat treatment: ☐
Coating: ☐

[Submit]

FIG. 6A

SYSTEMS AND METHODS FOR EFFICIENTLY IMPLEMENTING AN N-STEP MANUFACTURING PROCESS FOR PRODUCING A MECHANICAL PART

RELATED APPLICATIONS

This application is related to and claims priority from U.S. Provisional Patent Application Ser. No. 60/795,239, filed Apr. 24, 2006, for "Direct Parametric Control," with inventors W. Edward Red, C. Gregory Jensen, and Jordan Cox, which is incorporated herein by reference.

TECHNICAL FIELD

The present invention relates generally to the field of computer-aided design (CAD) and computer-aided manufacturing (CAM). More specifically, the present disclosure relates to systems and methods for efficiently implementing an N-step manufacturing process for producing a mechanical part.

BACKGROUND

Computer-aided design (CAD) and computer-aided manufacturing (CAM) tools have been in existence for many years, and have been extensively applied in the manufacturing industry. CAD software may be used to create three-dimensional models of mechanical parts (e.g., shafts, gears, turbine blades, etc.). These models may be referred to as CAD design models. CAM software may use CAD design models to generate process plans, which may include control instructions for driving equipment that is used to manufacture the parts. Sometimes CAD software and CAM software are used as separate components, while sometimes CAM software is integrated within a CAD system.

In many factories, mechanical parts require a sequence of manufacturing steps (e.g., rough machining, finish machining, inspection, grinding, polishing, etc.) to make a part within tolerance. During an N-step manufacturing process, the parts produced may not experience significant change in form or feature, but successive steps of the process can accumulate errors in part dimensions. Managing these errors can be quite important, particularly when these parts are components of an assembly or product (e.g., an engine).

At any point in an N-step manufacturing process, the accumulated errors thus far in the process sequence may cause the process planning of the next step to be adjusted (re-planned) to keep the part within its allowable total tolerance envelope. Sometimes this may require the geometry to be modified slightly using the geometry parameters. Presently, it is common practice to generate a new CAD design model and new process plans at each step of the manufacturing process. The CAD design model that is generated for a particular step of the manufacturing process reflects the dimensions of the part at that point in the manufacturing process. The CAD design model that is generated for a particular step is then used to generate new process plans appropriate to the equipment that will be used for that step of the manufacturing process.

BRIEF DESCRIPTION OF THE DRAWINGS

FIG. 6A illustrates an example of a user interface that may be utilized in accordance with the present disclosure;

DETAILED DESCRIPTION

Figure 1:
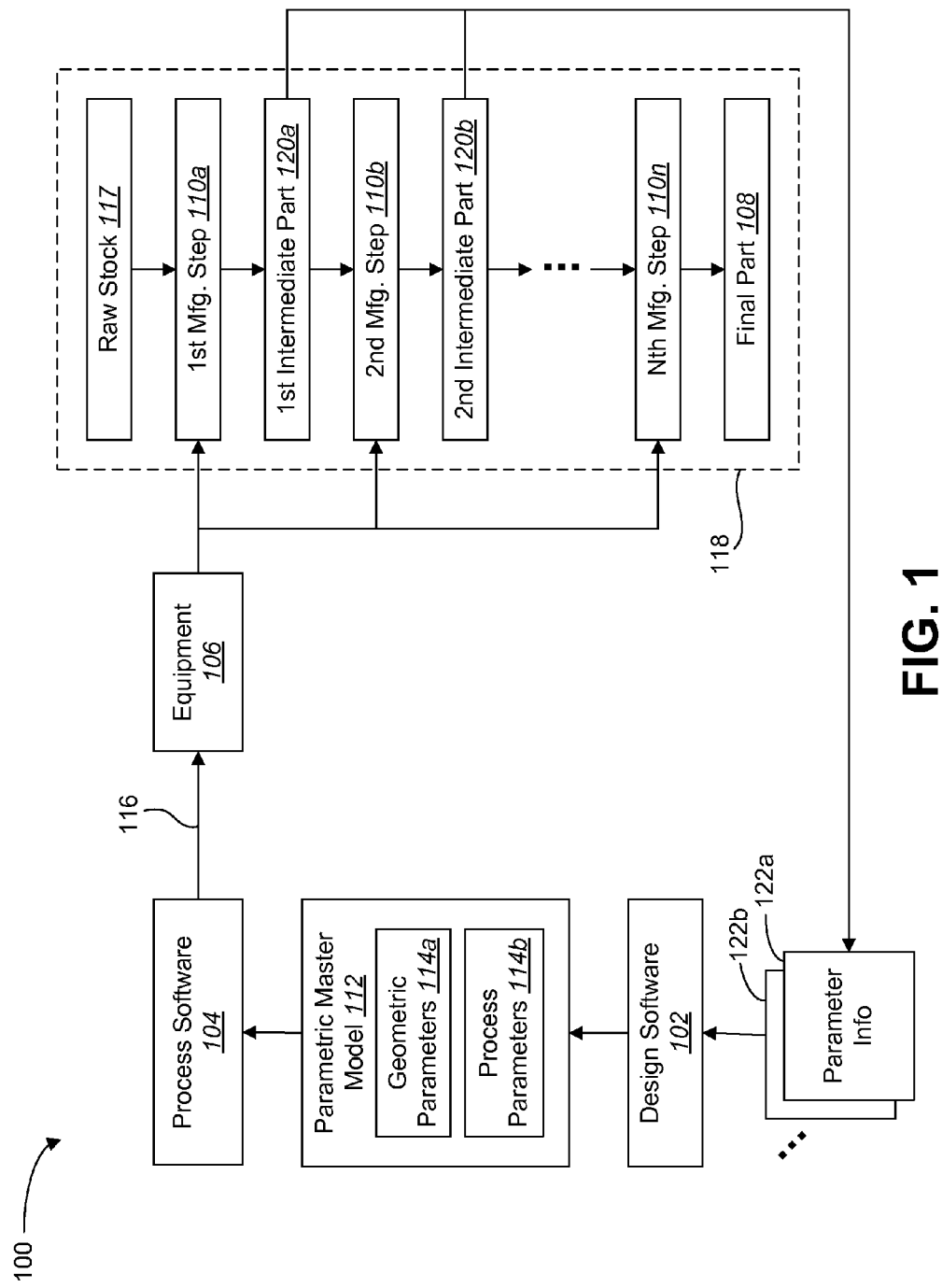
FIG. 1 is a functional block diagram that illustrates a system for efficiently implementing an N-step manufacturing process in accordance with the present disclosure.

A method for efficiently implementing an N-step manufacturing process for producing a mechanical part is disclosed. The method may include creating a parametric master model. The parametric master model may represent a part to be produced in an N-step manufacturing process. The parametric master model may be used to create process plans for the N-step manufacturing process. The method may also include, after manufacturing step i of the N-step manufacturing process, receiving information concerning values of parameters in the parametric master model as they exist after manufacturing step i of the N-step manufacturing process. The method may also include making updates to the parametric master model based on the information that was received and/or updating the parametric master model based on planned parametric variations at particular steps in the manufacturing process sequence after step i of the N-step manufacturing process. The method may also include updating the process plans corresponding to manufacturing step i+1 of the N-step manufacturing process based on the updated parametric master model.

The parametric master model and the process plans may be updated after each of manufacturing steps one through N. A new and separate design model and new process plans may not be re-created after each manufacturing step of the N-step process.

The updates to the parametric master model may be made automatically in response to the information about the values of the parameters being received. The process plans may be updated automatically in response to the updates being made to the parametric master model from tolerance process variations or to planned parametric variations.

At least some of the parameters in the parametric master model may comprise geometric parameters that are related to the part's geometry. At least some of the parameters in the parametric master model may include process parameters that are related to the N-step manufacturing process. At least some of the parameters in the parametric master model may comprise tolerance perturbations. Other parameters in the parametric master model may include planned parametric variations.

A computer system that is configured to efficiently implement an N-step manufacturing process for producing a mechanical part is disclosed. The computer system includes a processor and memory in electronic communication with the processor. Instructions may be stored in the memory. The instructions may be executable to create a parametric master model that represents a part to be produced in an N-step manufacturing process. The instructions may also be executable to use the parametric master model to create process plans for the N-step manufacturing process. The instructions may also be executable to, after manufacturing step i of the N-step manufacturing process, receive information concerning values of parameters in the parametric master model as they exist after manufacturing step i of the N-step manufacturing process, make updates to the parametric master model based on the information that was received or update the model based on planned parametric variations at particular steps in the manufacturing process sequence, and update the process plans corresponding to manufacturing step i+1 of the N-step manufacturing process based on the updated parametric master model.

A computer-readable medium comprising executable instructions is also disclosed. The instructions may be executable for creating a parametric master model that represents a part to be produced in an N-step manufacturing process. The instructions may also be executable for using the parametric master model to create process plans for the N-step manufacturing process. After manufacturing step i of the N-step manufacturing process, the instructions may be executable for: receiving information concerning values of parameters in the parametric master model as they exist after manufacturing step i of the N-step manufacturing process, making updates to the parametric master model based on the information that was received or based on planned parametric variations at particular steps in the manufacturing process sequence, and updating the process plans corresponding to manufacturing step i+1 of the N-step manufacturing process based on the updated parametric master model.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 is a functional block diagram that illustrates a system 100 for efficiently implementing an N-step manufacturing process in accordance with the present disclosure. Design software 102 and process software 104 are shown. The design software 102 may be computer-aided design (CAD) software, and the process software 104 may be computer-aided manufacturing (CAM) software.

An N-step manufacturing process 118 used to make a mechanical part 108 (e.g., a shaft, a gear, a turbine blade, etc.) is shown. The process 118 includes N manufacturing steps 110. Equipment 106 for performing the different manufacturing steps 110 is also shown.

The design software 102 may be used to create a parametric master model 112 that represents the part 108 that will be produced by the N-step manufacturing process 118. The parametric master model 112 may include one or more parameters 114 that are related to the part 108 to be produced. For example, the parametric master model 112 may include one or more geometric parameters 114a that are related to the geometry of the part 108 to be produced. The parametric master model 112 may also include one or more process parameters 114b that are related to aspects of the N-step manufacturing process 118 itself. At least some of the parameters 114 that are included in the parametric master model 112 may govern the production tolerances that have been defined for the part 108 to be produced. Others may govern geometric features that must be modified in shape during the N-step manufacturing process.

Once the parametric master model 112 has been created, it may be provided as input to the process software 104. The process software 104 may then use the parametric master model 112 to create process plans 116 for the N-step manufacturing process 118. The process plans 116 may include instructions for driving the equipment 106 that is used during the various manufacturing steps 110 of the N-step manufacturing process 118.

Initially, manufacturing step one 110a of the N-step manufacturing process 118 may be performed. The process plans 116 corresponding to manufacturing step one 110a may cause the equipment 106 to carry out manufacturing step one 110a by performing certain operations on raw stock 117 (i.e., the starting material from which the part 108 is being made), thereby producing a first intermediate version 120a of the part 108.

Information 122a concerning the values of the parameters 114 in the parametric master model 112, as they exist after manufacturing step one 110a of the N-step manufacturing process 118, may then be determined. This may involve measuring certain characteristics of the first intermediate version 120a of the part 108 after manufacturing step one 110a is completed. Once this information 122a about the values of the parameters 114 is determined, it may be provided to the design software 102 (e.g., via a user interface). In response to receiving the information 122a about the values of the parameters 114, the design software 102 may make updates to the parametric master model 112 based on the information 122a that was received. Once the parametric master model 112 has been updated, the process plans 116 corresponding to the next manufacturing step 110 (i.e., manufacturing step two 110b) may be updated based on the updated parametric master model 112.

The design software 102 may automatically update the parametric master model 112 in response to receiving the information 122a about the values of the parameters 114 after the first manufacturing step 110a is completed. For some geometric features, parametric variations are built into the model and associated with a particular manufacturing step. These are referred to as planned parametric variations. These features may not require process feedback to establish their relevant tolerances, but simply are parametrically activated at a particular step in the manufacturing process, such as a fillet size or a guide hole at step i in an N-step process. The related parameters would have 0 value up until the point they are activated in a particular manufacturing step. Process software 104 may automatically update the process plans 116 in response to the parametric master model 112 being updated. Thus, once the user of the design software 102 provides the information 122a about the values of the parameters 114 after the first manufacturing step 110a is completed, the parametric master model 112 and the process plans 116 may be updated without the user having to take any additional action.

Manufacturing step two 110b of the N-step manufacturing process 118 may then be performed. The updated process plans 116 corresponding to manufacturing step two 110b may cause the equipment 106 to carry out manufacturing step two 110b by performing certain operations on the first intermediate version 120a of the part 108, thereby producing a second intermediate version 120b of the part 108.

Information 122b concerning the values of the parameters 114 in the parametric master model 112, as they exist after manufacturing step two 110b of the N-step manufacturing process 118, may then be determined. Where the parameter variations relate to dimensional tolerances the process may require measuring certain characteristics of the second intermediate version 120b of the part 108 after manufacturing step two 110b is completed. Once this information 122b about the values of the parameters 114 is determined, it may be provided to the design software 102. In response to receiving the information 122b about the values of the parameters 114, the design software 102 may make updates to the parametric master model 112 based on the information 122b that was received. Once the parametric master model 112 has been updated, the process plans 116 corresponding to the next manufacturing step 110 (i.e., manufacturing step three) may be updated based on the updated parametric master model 112. The design software 102 may automatically update the parametric master model 112 in response to receiving the information 122a about the values of the parameters 114, and the process software 104 may automatically update the process plans 116 in response to the parametric master model 112 being updated.

The parametric master model 112 and the process plans 116 may continue to be updated in this manner after subsequent manufacturing steps 110 of the N-step manufacturing process 118. Once updates to the parametric master model 112 have been made to reflect the values of the parameters 114 that were determined after manufacturing step N–1 of the N-step manufacturing process 118, the process software 104 may then update the process plans 116 corresponding to manufacturing step N 110n of the N-step manufacturing process 118 based on the updated parametric master model 112. The updated process plans 116 corresponding to manufacturing step N 110n may cause the equipment 106 to carry out manufacturing step N 110n, which results in the final part 108 being produced.

The system 100 of FIG. 1 may provide certain advantages over known approaches. As indicated above, in an N-step manufacturing process 118 for producing a part 108, it is common practice to generate a new design model and new process plans for each manufacturing step. Thus, in an N-step manufacturing process 118, it may occur that N separate and distinct design models and N process plans are generated. In contrast, in the system 100 of FIG. 1, only a single design model (the parametric master model 112) and a single set of process plans 116 are created. This single design model 112 and single set of process plans 116 are then updated throughout the N-step manufacturing process 118. It may be that the parameter variations that occur at successive manufacturing steps 110 may be the only differences between the original design model 112 and the updated versions of the design model 112 that are created during the N-step manufacturing process 118. Thus, the system 100 of FIG. 1 does not result in new design models being re-created at each manufacturing step. Rather, the parametric master model 112 is simply updated as appropriate throughout the N-step manufacturing process 118. In this way, the system 100 of FIG. 1 may significantly reduce the personnel costs and the data storage requirements for implementing N-step manufacturing processes 118 relative to current approaches.

Although a single design model 112 and a single set of process plans 116 are generated in the system 100 of FIG. 1, multiple design models 112 and/or process plans 116 may be created consistent with the present disclosure. However, the number of design models 112 and process plans 116 that are created in connection with a particular part 108 is typically less than the number of steps in the N-step manufacturing process 118 that is followed to manufacture the part 108.

The parametric master model 112 and the process plans 116 may be updated whenever a manufacturing step 110 is performed that may affect parameters 114 in the parametric master model 112 or when a planned parametric variation is activated for a manufacturing step. In the system 100 of FIG. 1, the parametric master model 112 and the process plans 116 are updated after each of manufacturing steps one through N–1. However, under some circumstances it may not be necessary to update the parametric master model 112 and the process plans 116 after each manufacturing step 110.

To implement the system 100 shown in FIG. 1, direct control technologies may be utilized, in which the process software 104 directly controls the equipment 106 that performs the manufacturing steps 110 without converting the process plans 116 into equipment-specific control instructions. Additional information about direct control technologies is provided in U.S. patent application Ser. No. 10/276, 361, titled "Method and System for Controlling a Machine With Direct Transfer of Machining Data," filed Nov. 15, 2002, with inventors Walter E. Red, C. Gregory Jensen, Mark S. Evans, C. Porter Bassett, Corey L. McBride, Jonathan E. Bosley, and Girish C. Ghmire (hereinafter, "the '361 application"). Additional information about direct control technologies is also provided in U.S. Pat. No. 6,895,299, titled "Systems and Methods for Representing Complex N-Curves for Direct Control of Tool Motion," issued May 17, 2005, with inventors Walter E. Red, Robert M. Cheatham, and C. Gregory Jensen (hereinafter, "the '299 patent"). Additional information about direct control technologies is also provided in U.S. patent application Ser. No. 10/823,465, titled "Systems and Methods for Controlling and Monitoring Multiple Electronic Devices," filed Apr. 13, 2004, with inventors Walter E. Red, Michael S. Baxter, and Daniel J. Thompson (hereinafter, "the '465 application"). The '361 application, the '299 patent and the '465 application are all hereby incorporated by reference. Although direct control technologies may be utilized, the system 100 may alternatively be implemented without the use of direct control technologies.

In FIG. 1, the design software 102 and the process software 104 are shown separately. However, the design software 102 and the process software 104 may be integrated together under some circumstances. Also, the design software 102 and the process software 104 may be running on the same computer, or on different computers. If the design software 102 and the process software 104 are running on different computers, the computers may be directly connected to one another, or they may be connected to one another via one or more computer networks.

Figure 2:
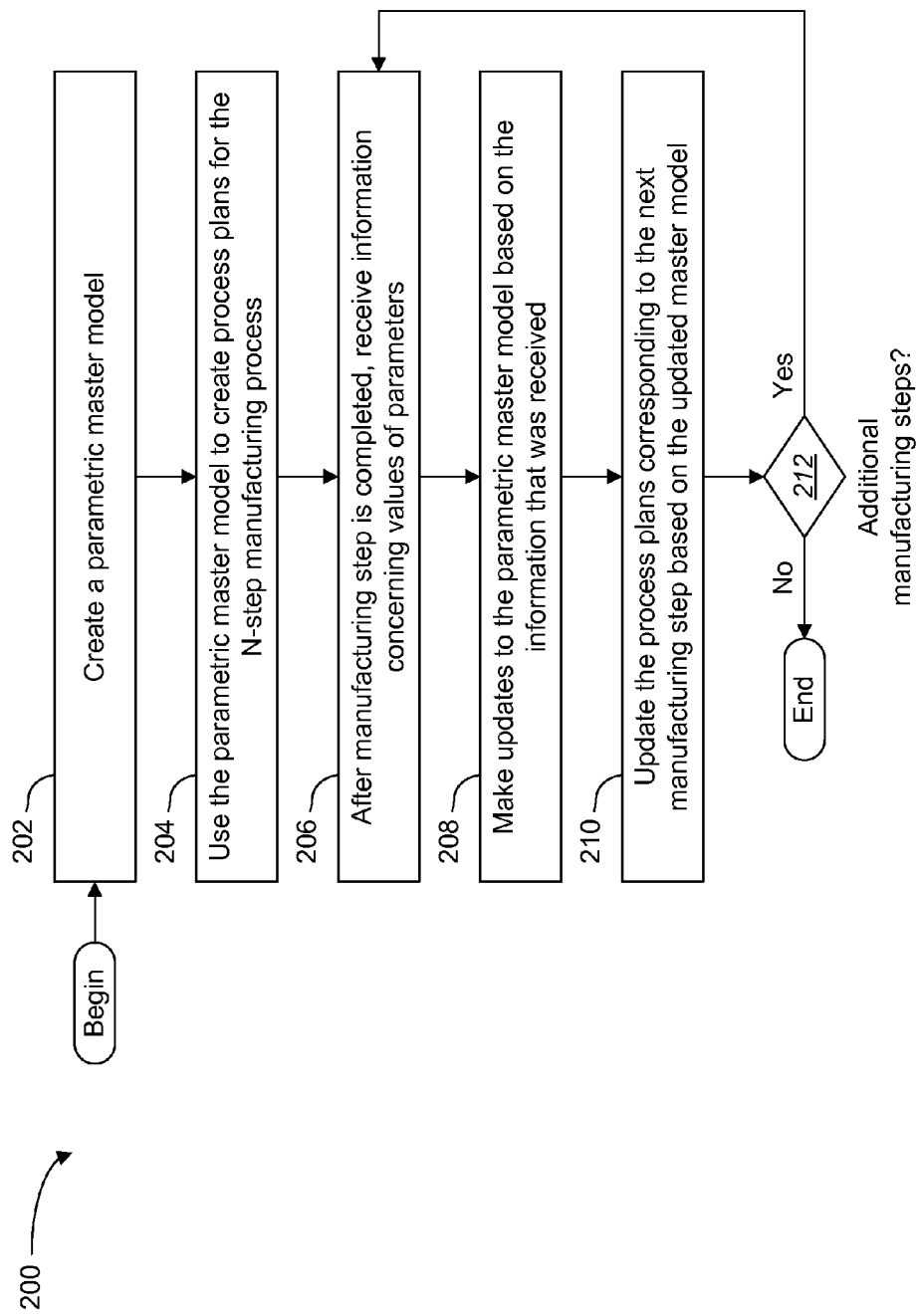
FIG. 2 is a flow diagram that illustrates a method for efficiently implementing an N-step manufacturing process in accordance with the present disclosure.

FIG. 2 is a flow diagram that illustrates a method 200 for efficiently implementing an N-step manufacturing process 118 in accordance with the present disclosure. The method 200 may be performed by the design software 102 and the process software 104 in the system 100 of FIG. 1.

The method 200 includes creating 202 a parametric master model 112 that represents a part 108 to be produced in an N-step manufacturing process 118. The method 200 also includes using 204 the parametric master model 112 to create process plans 116 for the N-step manufacturing process 118.

As discussed above, the process plans 116 may initially cause the equipment 106 to carry out manufacturing step one 110a. After manufacturing step one 110a is completed, information 122 may be received 206 concerning the values of the parameters 114 in the parametric master model 112, as they exist after manufacturing step one 110a of the N-step manufacturing process 118. In response to receiving 206 the information 122 about the values of the parameters 114, the parametric master model 112 may be updated 208 based on the information 122 that was received 206. Once the parametric master model 112 has been updated 208, the process plans 116 corresponding to the next manufacturing step 110 may be updated 210 based on the updated parametric master model 112. In some implementations, the parametric master model 112 may be automatically updated 208 in response to the information 122 about the values of the parameters 114 being received 206, and the process plans 116 may be automatically updated 210 in response to the updates being made to the parametric master model 112 or when planned parametric variations are activated for a particular manufacturing step.

The method 200 may then include determining 212 whether there are additional manufacturing steps 110 in the N-step manufacturing process 118. If there is at least one additional manufacturing step 110 to perform, then the method 200 may include returning to step 206 and proceeding as described above in connection with the next manufacturing step 110. Once it is determined 212 that no additional manufacturing steps 110 remain in the N-step manufacturing process 118 (i.e., the final part 108 has been produced), then the method 200 may end.

Steps 206, 208 and 210 of the method 200 shown in FIG. 2 may be generalized as follows. After manufacturing step i 110 of an N-step manufacturing process 118 is completed (where i can be any integer from 1 to N−1), information 122 may be received 206 concerning the values of the parameters 114 in the parametric master model 112, as they exist after manufacturing step i is completed. In response to receiving 206 the information 122 about the values of the parameters 114, the parametric master model 112 may be updated 208 based on the information 122 that was received 206. Once the parametric master model 112 has been updated 208, the process plans 116 corresponding to manufacturing step i+1 110 may be updated 210 based on the updated parametric master model 112.

Figure 3:
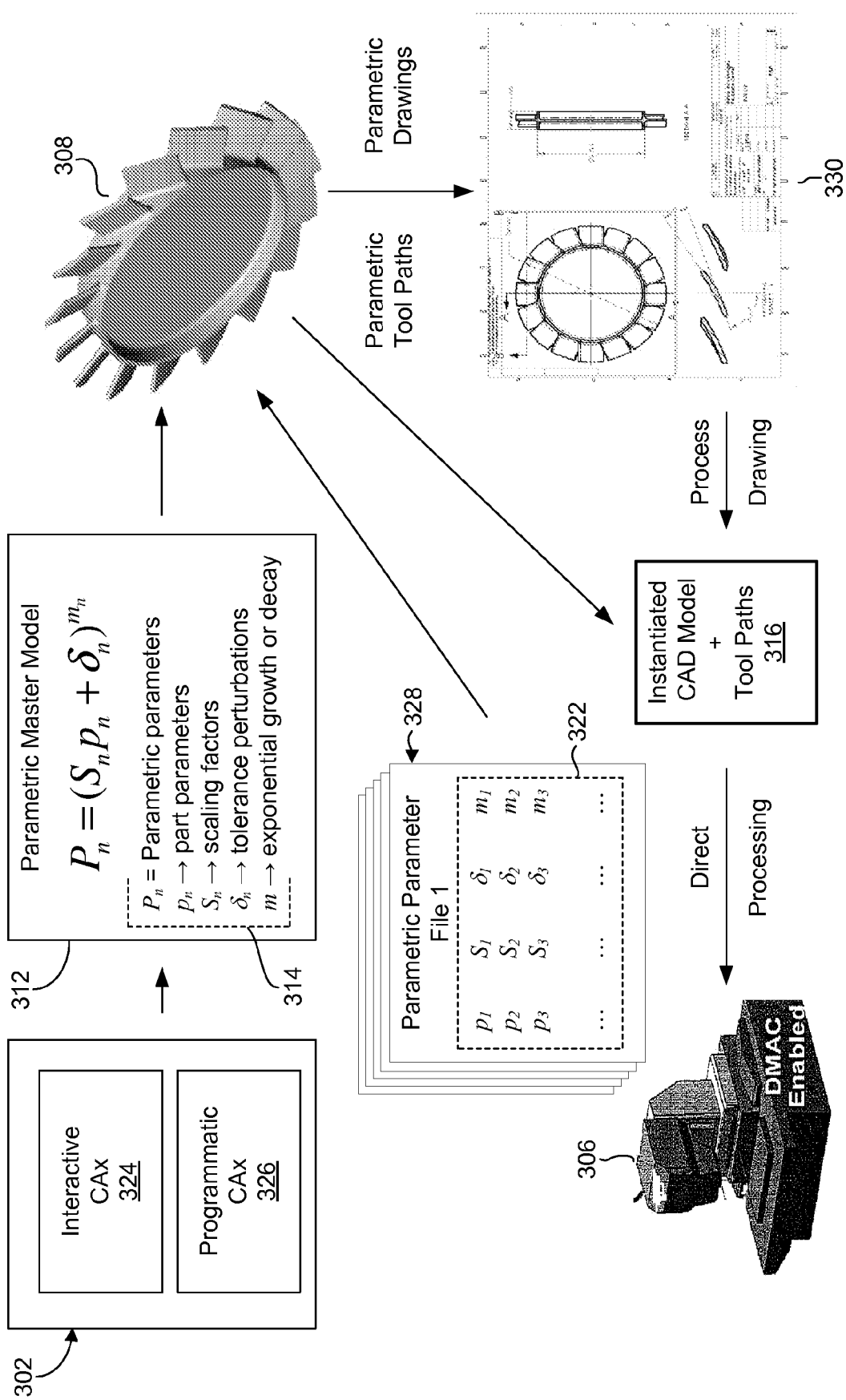
FIG. 3 illustrates an example showing how the system and method of FIGS. 1-2 may be implemented.

FIG. 3 illustrates an example showing how the system 100 and method 200 of FIGS. 1-2 may be implemented. In this example, the part 308 to be produced is a turbine rotor 308. Design software 302 may be used to create a parametric master model 312 corresponding to the turbine rotor 308. The design software 302 that is used to create the parametric master model 312 may include an interactive component 324 and a programmatic component 326.

As indicated above, the parametric master model 312 may include one or more parameters 314 that are related to the part 308 to be produced (i.e., the turbine rotor 308). In FIG. 3, the parametric master model 312 is shown with several different parameters 314, including part parameters, scaling factors, tolerance perturbations, and parameters that describe the exponential growth or decay of the other parameters. Equation (1) describes one possible way that these parameters 314 may be related to one another:

$$P_n = (S_n p_n + \delta_n)^{m_n} \quad (1)$$

In equation (1), the term $P_n$ refers to parametric parameters. The term $p_n$ refers to part parameters. The term $S_n$ refers to scaling factors which may, for planned parametric variations, have a zero value for some steps of the manufacturing sequence and then be non-zero for other steps. The term $\delta_n$ refers to tolerance perturbations.

A plurality of parametric parameter files 328 are also shown in FIG. 3. As indicated above, after a particular manufacturing step 110 of an N-step manufacturing process 118, information 322 may be determined concerning values of parameters 314 in the parametric master model 312 as they exist at that point in the manufacturing process 118. This information 322 may be stored in a parametric parameter file 328. Because this may be done for multiple manufacturing steps 110 of an N-step manufacturing process 118, multiple parametric parameter files 328 are shown in FIG. 3.

When a parametric parameter file 328 is created that includes information 322 concerning values of parameters 314 in the parametric master model 312 as they exist at that point in the manufacturing process 118, the parametric master model 312 may be updated based on the information 322 included in the parametric parameter file 328. Stated another way, the parametric parameter file 328 may be applied to the parametric master model 312, so that the parametric master model 312 may be updated based on the information 322 included in the parametric parameter file 328.

The updated parametric master model 312 may be used to create updated drawings 330 and to update process plans 316 that may be used in connection with the next manufacturing step 110 of the manufacturing process 118. The process plans 316 may include instructions (e.g., tool paths) for driving the equipment 306 that is used for the next manufacturing step 110 of the manufacturing process 118.

Figure 4A:
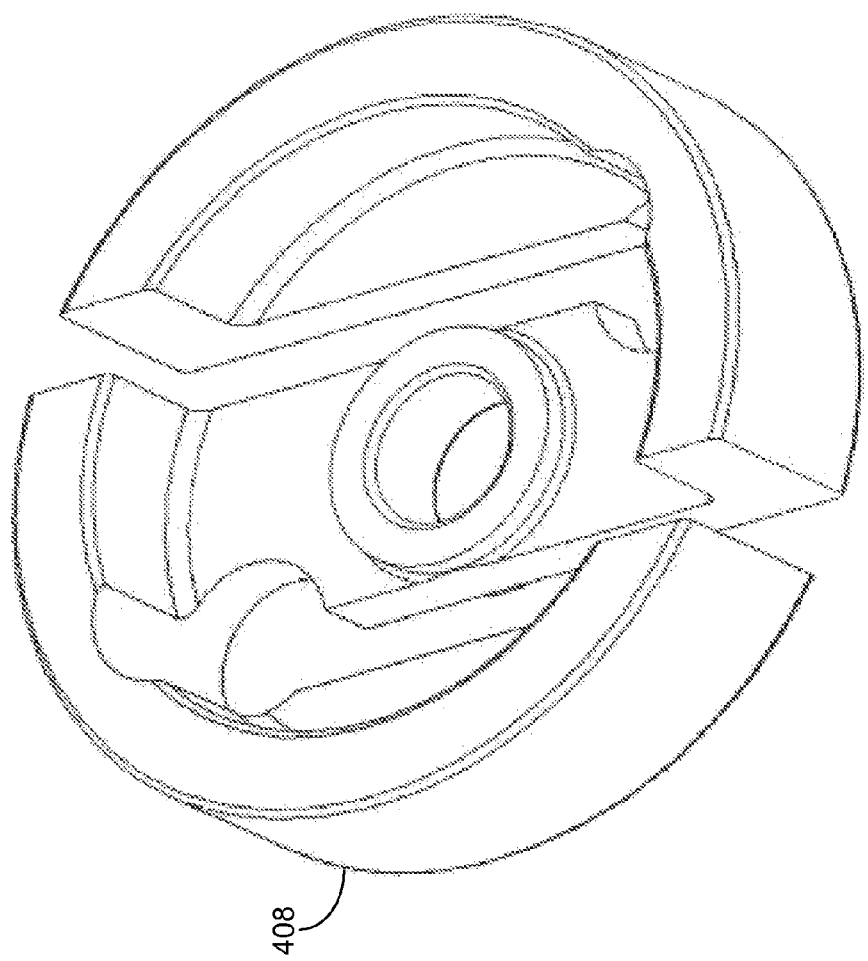
FIG. 4A illustrates an example of a mechanical part to which the systems and methods disclosed herein may be applied.

FIG. 4A illustrates an example of a mechanical part 408 to which the systems and methods disclosed herein may be applied. The part 408 that is shown in FIG. 4A is a compliant clutch 408.

Figure 4B:
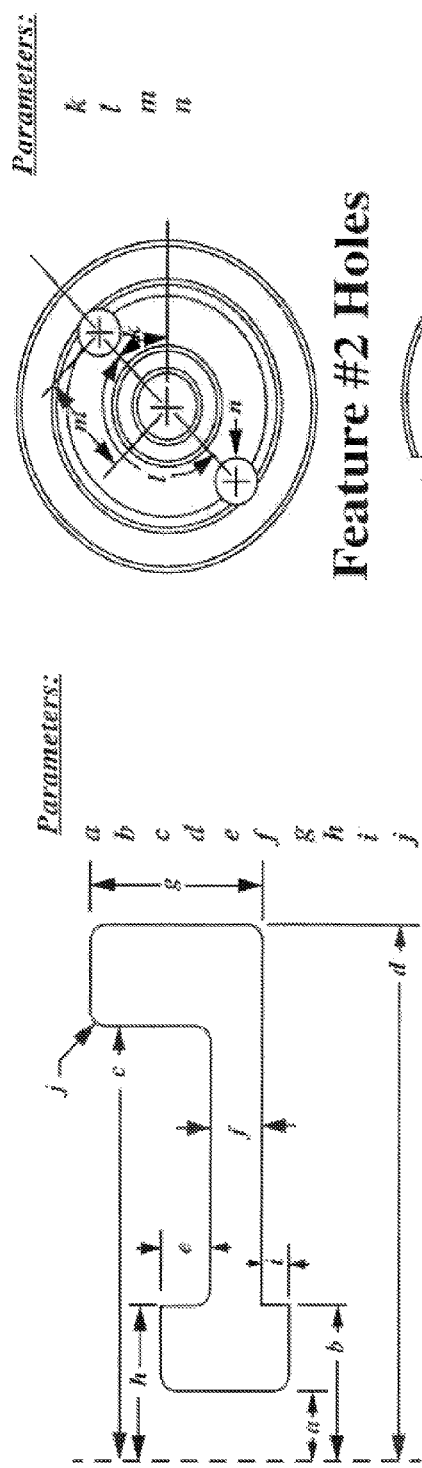
FIG. 4B illustrates an example of the type of information that may be included in a parametric master model corresponding to the part that is shown in FIG. 4A.
Figure 4B:
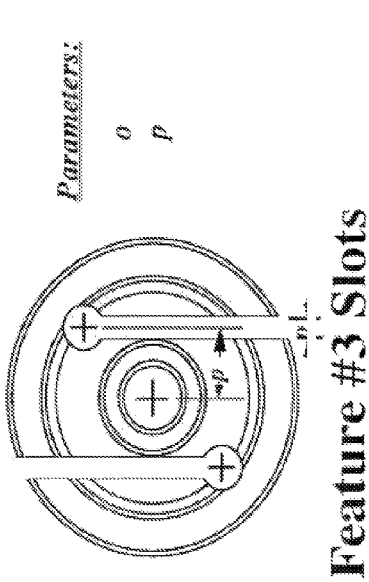

FIG. 4B illustrates an example of the type of information that may be included in a parametric master model 112 corresponding to the compliant clutch 408 that is shown in FIG. 4A. A parametric master model 112 corresponding to the compliant clutch 408 may include parameters 114 describing various features of the compliant clutch 408. The features of the compliant clutch 408 that are illustrated in FIG. 4B include a profile, holes and slots. In the depicted example, parameters a-j are used to describe the profile feature, parameters k-n are used to describe the holes feature, and parameters o-p are used to describe the slots feature. Relationships between parameters 114 may also be included in the parametric master model 112. Some examples of relationships that may be defined for the profile feature of the compliant clutch 408 are shown in FIG. 4B.

Figure 5:
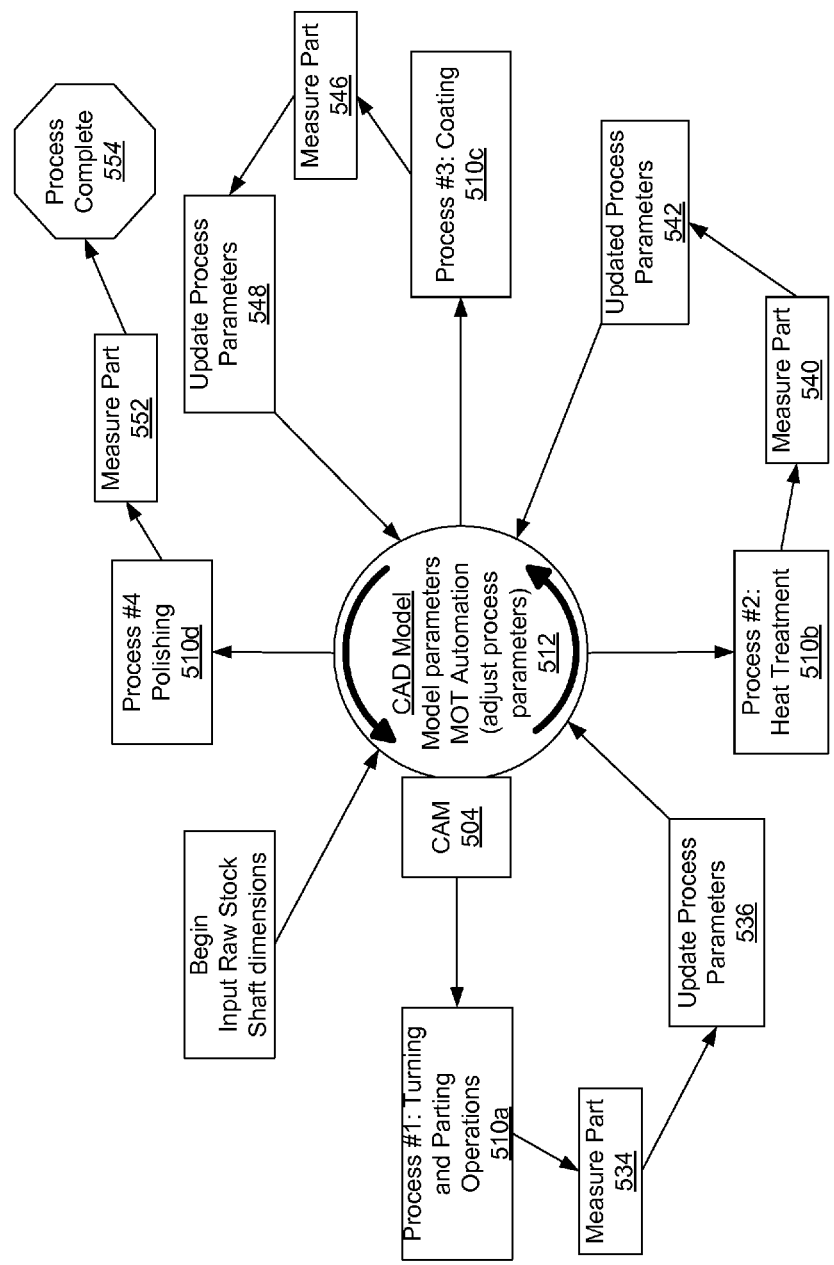
FIG. 5 illustrates another example showing how the system and method of FIGS. 1-2 may be implemented.

FIG. 5 illustrates another example showing how the system 100 and method 200 of FIGS. 1-2 may be implemented. In this example, it will be assumed that the part 108 to be produced is a shaft, and that a four-step manufacturing process 118 is used to manufacture the shaft.

Design software 102 may be used to create a parametric master model 512 that represents the shaft to be produced. Once the parametric master model 512 has been created, process software 504 (e.g., CAM software 504) may use the parametric master model 512 to create process plans 116 for the N-step manufacturing process 118.

Manufacturing step one in this example includes turning and parting operations 510a. After the turning and parting operations 510a are performed, information 122 concerning the current values of the parameters 114 in the parametric master model 512 (i.e., the values of the parameters 114 as they exist after the turning and parting operations 510a are completed) may then be determined. This may involve measuring 534 certain characteristics of the shaft after the turning and parting operations 510a are completed. Once this information 122 is determined, the parametric master model 512 may be updated 536 to reflect the values of the parameters 114 contained therein at this point in the manufacturing process 118.

Manufacturing step two in this example is a heat treatment operation 510b. After the heat treatment operation 510b is performed, information 122 concerning the current values of the parameters 114 in the parametric master model 512 (i.e., the values of the parameters 114 as they exist after the heat treatment operation 510b is completed) may then be determined. This may involve measuring 540 certain characteristics of the shaft after the heat treatment operation 510b is completed. Once this information 122 is determined, the parametric master model 512 may be updated 542 to reflect the values of the parameters 114 contained therein at this point in the manufacturing process 118.

Manufacturing step three in this example is a coating operation 510c. After the coating operation 510c is performed, information 122 concerning the current values of the parameters 114 in the parametric master model 512 (i.e., the values of the parameters 114 as they exist after the coating operation 510c is completed) may then be determined. This may involve measuring 546 certain characteristics of the shaft after the coating operation 510c is completed. Once this information 122 is determined, the parametric master model 512 may be updated 548 to reflect the values of the parameters 114 contained therein at this point in the manufacturing process 118.

Manufacturing step four in this example is a polishing operation 510d. After the polishing operation 510d is performed, various characteristics of the shaft may be measured 552. If these characteristics of the shaft are within allowable tolerances, then the manufacturing process is completed 554.

FIG. 6A illustrates an example of a user interface 656 that may be utilized in accordance with the present disclosure. The user interface 656 may facilitate user entry of information 122 concerning values of parameters 114 in the parametric master model 112 as they exist after a particular manufacturing step 110 of an N-step manufacturing process 118. The user interface 656 shown in FIG. 6A corresponds to the example that was discussed above in connection with FIG. 5. Text boxes 658 are shown for allowing users to enter values of certain parameters 114 of the shaft. The user interface 656 also allows a user to select the manufacturing step that the values being entered correspond to.

Figure 6B:
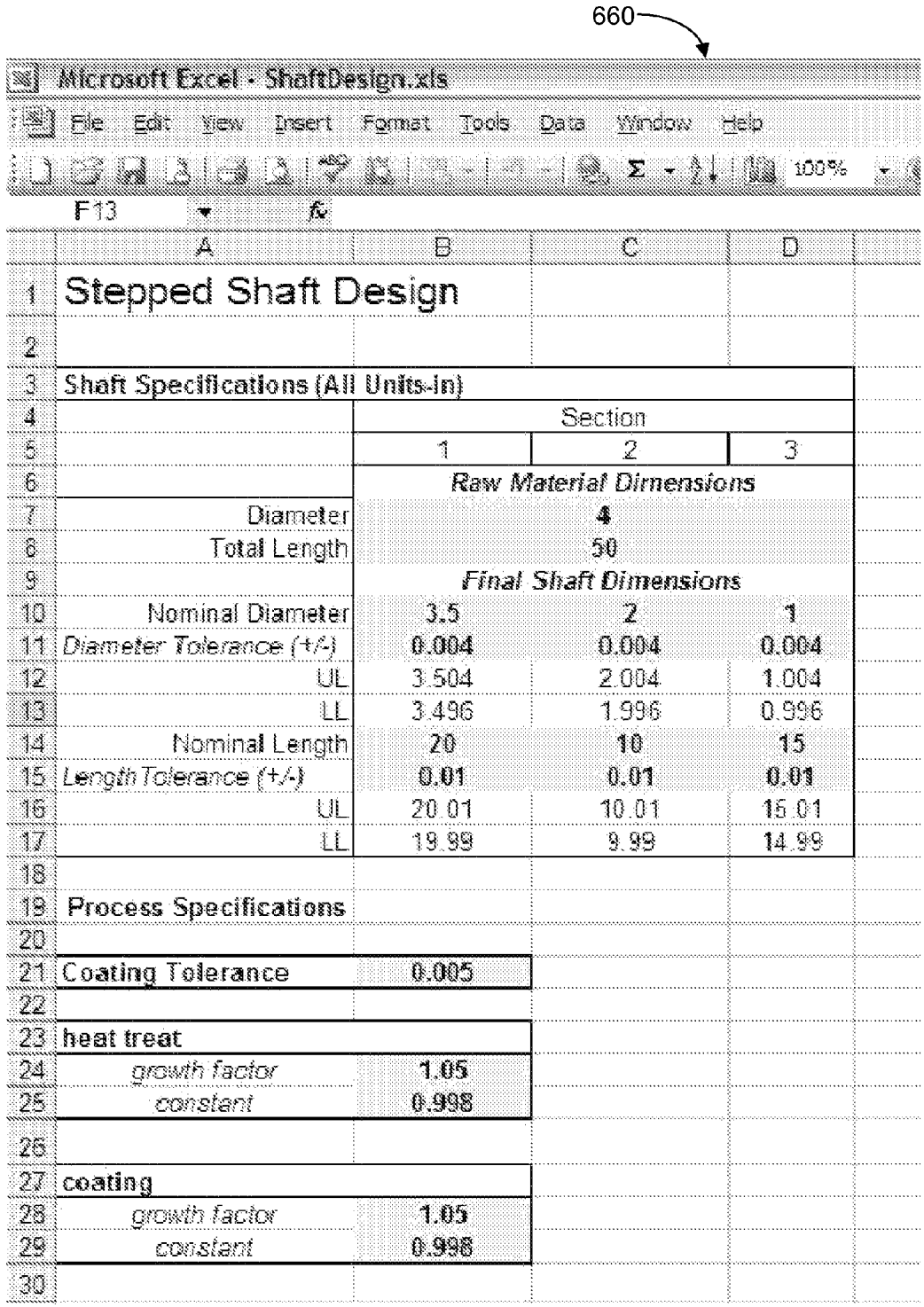
FIG. 6B shows one possible implementation of certain mathematical and heuristic rules that may be utilized in accordance with the present disclosure.

FIG. 6B shows one possible implementation of certain mathematical and heuristic rules 660 that may be utilized in accordance with the present disclosure. The mathematical and heuristic rules 660 may be used to make a parametric master model 112 be N-step compliant. The implementation 660 shown in FIG. 6B corresponds to the example that was discussed above in connection with FIG. 5.

Figure 7:
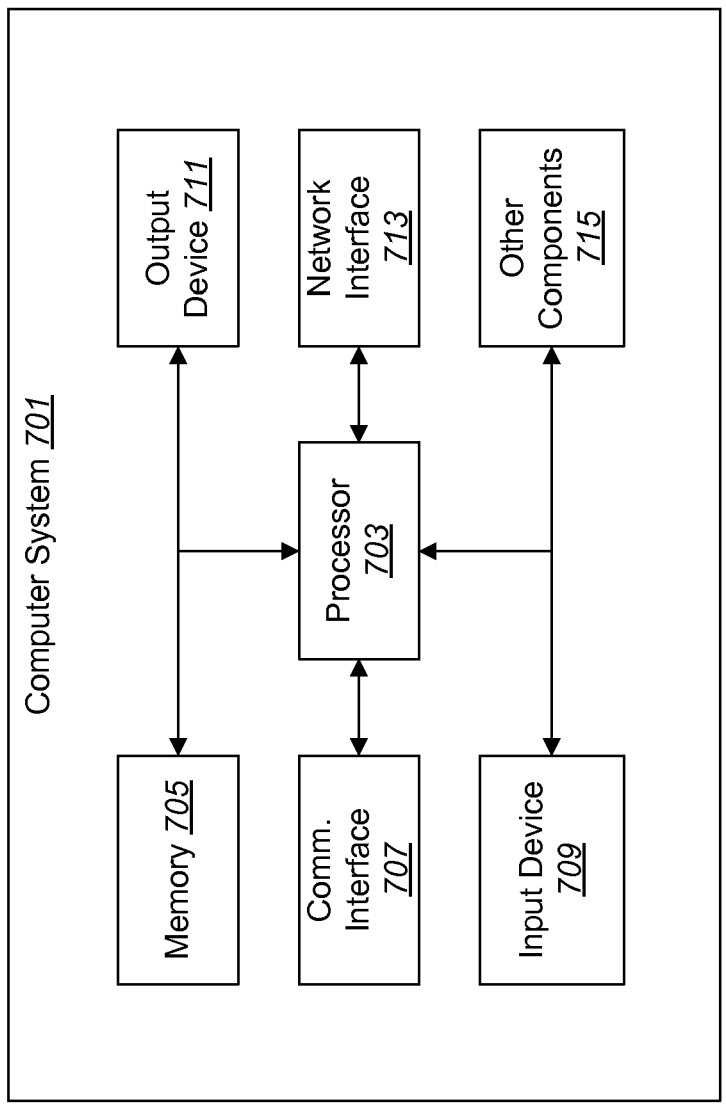
FIG. 7 illustrates various components that may be utilized in a computer system.

FIG. 7 illustrates various components that may be utilized in a computer system 701. The design software 102 and process software 104 in the system 100 of FIG. 1 may run on one or more computer systems such as the computer system 701 shown in FIG. 7. The components shown in FIG. 7 in connection with the depicted computer system 701 may be located within the same physical structure or in separate housings or structures.

The computer system 701 is shown with a processor 703 and memory 705. The processor 703 may control the operation of the computer system 701 and may be embodied as a microprocessor, a microcontroller, a digital signal processor (DSP) or other device known in the art. The processor 703 typically performs logical and arithmetic operations based on program instructions stored within the memory 705. The instructions in the memory 705 may be executable to implement the methods described herein.

The computer system 701 may also include one or more communication interfaces 707 and/or network interfaces 713 for communicating with other electronic devices. The communication interface(s) 707 and the network interface(s) 713 may be based on wired communication technology, wireless communication technology, or both.

The computer system 701 may also include one or more input devices 709 and one or more output devices 711. The input devices 709 and output devices 711 may facilitate user input. Other components 715 may also be provided as part of the computer system 701.

FIG. 7 illustrates only one possible configuration of a computer system 701. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the present disclosure may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the present disclosure without departing from the scope of the claims.

What is claimed is:

1. A method for efficiently implementing an N-step manufacturing process for producing a mechanical part, comprising:
   creating a parametric master model that represents a part to be produced in an N-step manufacturing process;
   using the parametric master model to create process plans for the N-step manufacturing process, wherein the parametric master model is a mathematical model comprising parameters that can be varied to do at least one of the following:
      change the shape of the mechanical part, change the size of the mechanical part, add features to the mechanical part, and delete features from the mechanical part; and
   after manufacturing step i of the N-step manufacturing process:
      receiving information concerning values of parameters in the parametric master model as they exist after manufacturing step i of the N-step manufacturing process;
      making updates to the parametric master model based on the information that was received or updating the parametric master model based on planned parametric variations at particular steps in the manufacturing process sequence, wherein the parametric master model is updated without creating a new model; and
   updating the process plans corresponding to manufacturing step i+1 of the N-step manufacturing process based on the updated parametric master model;
   wherein the N-step manufacturing process involves the use of different manufacturing process types.

2. The method of claim 1, wherein a new and separate design model and new process plans are not re-created after each manufacturing step of the N-step manufacturing process.

3. The method of claim 1, wherein at least some of the parameters in the parametric master model comprise geometric parameters that are related to the part's geometry.

4. The method of claim 1, wherein at least some of the parameters in the parametric master model comprise process parameters that are related to the N-step manufacturing process.

5. The method of claim 1, wherein at least some of the parameters in the parametric master model comprise tolerance perturbations, while others comprise planned parametric variations.

6. The method of claim 1, wherein the updates to the parametric master model are made automatically in response to the information about the values of the parameters being received, and wherein the process plans are updated automatically in response to the updates being made to the parametric master model from tolerance process variations or to planned parametric variations.

7. The method of claim 1, wherein the value of i can be any integer from 1 to N.

8. The method of claim 1, wherein the parametric master model and the process plans are updated after each of manufacturing steps one through N.

9. A computer system that is configured to efficiently implement an N-step manufacturing process for producing a mechanical part, the computer system comprising:
   a processor;
   memory in electronic communication with the processor;
   instructions stored in the memory, the instructions being executable to:
      create a parametric master model that represents a part to be produced in an N-step manufacturing process;
      use the parametric master model to create process plans for the N-step manufacturing process, wherein the parametric master model is a mathematical model comprising parameters that can be varied to do at least one of the following: change the shape of the mechanical part, change the size of the mechanical part, add features to the mechanical part, and delete features from the mechanical part; and
      after manufacturing step i of the N-step manufacturing process:
         receive information concerning values of parameters in the parametric master model as they exist after manufacturing step i of the N-step manufacturing process;
         make updates to the parametric master model based on the information that was received or update the model based on planned parametric variations at particular steps in the manufacturing process sequence, wherein the parametric master model is updated without creating a new model; and
         update the process plans corresponding to manufacturing step i+1 of the N-step manufacturing process based on the updated parametric master model;
      wherein the N-step manufacturing process involves the use of different manufacturing process types.

10. The computer system of claim 9, wherein a new and separate design model and new process plans are not re-created after each manufacturing step of the N-step manufacturing process.

11. The computer system of claim 9, wherein at least some of the parameters in the parametric master model comprise geometric parameters that are related to the part's geometry.

12. The computer system of claim 9, wherein at least some of the parameters in the parametric master model comprise process parameters that are related to the N-step manufacturing process.

13. The computer system of claim 9, wherein at least some of the parameters in the parametric master model comprise tolerance perturbations, while others comprise planned parametric variations.

14. The computer system of claim 9, wherein the updates to the parametric master model are made automatically in response to the information about the values of the parameters being received, and wherein the process plans are updated automatically in response to the updates being made to the parametric master model from tolerance process variations or to planned parametric variations.

15. A computer-readable medium comprising executable instructions for:
   creating a parametric master model that represents a part to be produced in an N-step manufacturing process;
   using the parametric master model to create process plans for the N-step manufacturing process, wherein the parametric master model is a mathematical model comprising parameters that can be varied to do at least one of the following:

change the shape of the mechanical part, change the size of the mechanical part, add features to the mechanical part, and delete features from the mechanical part; and after manufacturing step i of the N-step manufacturing process:

receiving information concerning values of parameters in the parametric master model as they exist after manufacturing step i of the N-step manufacturing process;

making updates to the parametric master model based on the information that was received or updating the model based on planned parametric variations at particular steps in the manufacturing process sequence, wherein the parametric master model is updated without creating a new model; and updating the process plans corresponding to manufacturing step i+1 of the N-step manufacturing process based on the updated parametric master model;

wherein the N-step manufacturing process involves the use of different manufacturing process types.

16. The computer-readable medium of claim 15, wherein a new and separate design model and new process plans are not re-created after each manufacturing step of the N-step manufacturing process.

17. The computer-readable medium of claim 15, wherein at least some of the parameters in the parametric master model comprise geometric parameters that are related to the part's geometry.

18. The computer-readable medium of claim 15, wherein at least some of the parameters in the parametric master model comprise process parameters that are related to the N-step manufacturing process.

19. The computer-readable medium of claim 15, wherein at least some of the parameters in the parametric master model comprise tolerance perturbations, while others comprise planned parametric variations.

20. The computer-readable medium of claim 15, wherein the updates to the parametric master model are made automatically in response to the information about the values of the parameters being received, and wherein the process plans are updated automatically in response to the updates being made to the parametric master model from tolerance process variations or to planned parametric variations.

* * * * *